J. SHARP.
CHUCK.
APPLICATION FILED MAR. 21, 1917.

1,273,546.

Patented July 23, 1918.

INVENTOR
John Sharp
By Kay Totten Powell
attys

UNITED STATES PATENT OFFICE.

JOHN SHARP, OF OAKMONT, PENNSYLVANIA.

CHUCK.

1,273,546.   Specification of Letters Patent.   Patented July 23, 1918.

Application filed March 21, 1917. Serial No. 156,346.

*To all whom it may concern:*

Be it known that I, JOHN SHARP, a citizen of the United States, and resident of Oakmont, in the county of Allegheny and State of Pennsylvania, have invented a new and useful Improvement in Chucks; and I do hereby declare the following to be a full, clear, and exact description thereof.

My invention relates to chucks, more particularly to that type of chuck known as friction chucks, that is, a chuck which holds and drives the work solely through frictional engagement with the work.

The invention is devised primarily to provide chucking mechanism for engaging and rotating tubes, caps and the like of smooth exterior, and has special advantages when, by reason of the nature of the work to be done, or of the shape of the work to be held, ordinary collets or chucks cannot be employed.

The invention is directed particularly, though not exclusively to a chuck for bottle capping machines for rotating threaded bottle caps, to screw-seat the caps on the bottles.

Figure 1:
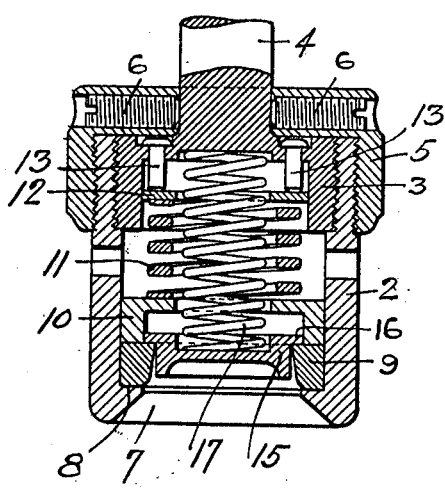
Figure 2:
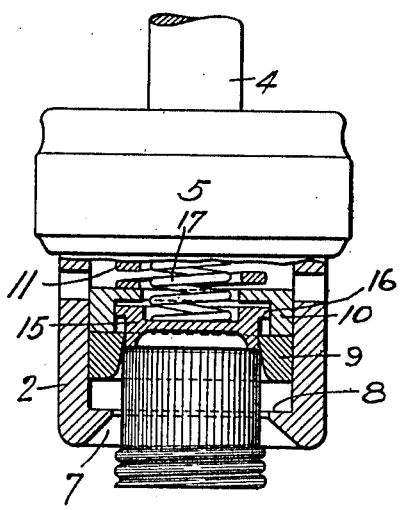
Figure 3:
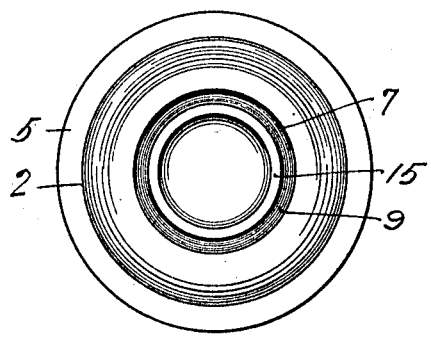

The invention consists in the novel structural features and combination and arrangement of parts hereinafter fully described and claimed; and illustrated in the accompanying drawings, in which Figure 1 is a vertical sectional view of a chuck made in accordance with my invention; Fig. 2 is an elevation, part in vertical section of the chuck in operative driving engagement with the work; and Fig. 3 is a bottom plan view of the chuck. The numeral 2 indicates the body or barrel of the chuck, which is screw-threaded for attachment to the head 3 of the chuck-spindle 4. A cap-piece 5 surrounds the spindle and is screw-threadedly connected to the body. Set-screws 6 secure the cap to the spindle and prevent rotation or unscrewing of the cap.

By this arrangement it will be seen positive locking means is provided which prevent unscrewing of the thread connected parts and the arrangement permits of ready detachment of parts for repairs and for adjustment as hereinafter described.

The lower end of the chuck body has the work-centering and receiving opening 7; and the body has a shoulder 8 formed therein adjacent the opening adapted as a seat for supporting a friction work-engaging collet or ring-jaw 9. This ring-jaw preferably has its bore slightly tapered so as to provide wedging frictional engagement with the work. A follower ring 10 rests upon the collet and forms a seat for a compression spring 11. Spring 11 is interposed between the follower and an abutment of the spindle head, and when compressed and under tension by engagement of the collet with the work produces friction between the follower and the collet for driving the collet. The collet in this instance is free on its seat, and is connected to the chuck in driving only through friction engagement when the spring 11 is under tension. This is a preferable arrangement, as means is thus provided which permit slipping between collet and follower when overloading occurs, and which prevents excessive wedging of work in the collet. Positive driving of the collet or ring may be had by providing flat faces to the collet and corresponding flat faces to the barrel, or by key connection.

The fixed abutment for spring 11 is so constructed as to provide means for varying the tension of the spring. This is accomplished in the following manner: A floating ring 12 is provided against which the spring bears. This ring seats upwardly against the ends of pins 13 loosely journaled in the spindle head. The heads of the pins engage the inner face of the cap-piece, and are held against upward movement. It will be seen that by adjusting the cap-piece on the barrel, these pins will be permitted to move up or down according to the direction in which the cap is screwed, and in this manner the springs tension may be regulated. Also the pins may be removed, and longer pins or shorter pins substituted, to increase or decrease the spring-tension for different kinds of work.

The chuck is provided with ejecting means for freeing the work from the wedge collet, said means comprising a plunger 15, which has a flange 16 for seating on the collet 9. A spring 17 is interposed between the upper face of the plunger and a seat in the spindle head. The spring acts normally to seat the plunger on the collet, and the plunger projects into the bore of the collet or ring far enough so as to be engaged by the work before the work engages the friction-drive collet. In this manner, it will be seen that the spring 17 will be put under tension, and will act to eject the work from the ring when the chuck is moved to free the work. Provision for varying the tension of the spring is made by the screw thread connection of the spindle head with the barrel.

The advantages of my invention will be appreciated by those skilled in the art. While I have shown and described my invention as particularly adapted for chucking caps and the like, there is presented a structure adapted for holding and driving by edge engagement other articles, such as thin tubes and the like in other arts, such as in lathe work, and such thin material may be chucked with less liability to damage than would be the case if the usual compression and expanding jaw type of chuck were employed.

It will be apparent that the chuck may be varied in many particulars and structural details without departing from the spirit of the invention.

What I claim is:

1. A chuck comprising the combination of a chuck-body having a cylindrical bore, said chuck adapted to receive the work endwise of the bore, a floating jaw disposed within the bore of the body for frictionally holding the work, and flexible means in the bore longitudinally-yieldable therein for effecting yieldable rotary driving connection of the jaw to the body for driving the work.

2. A chuck comprising the combination of a chuck-body having a cylindrical bore, said chuck adapted to receive the work endwise of the bore, a floating jaw disposed within the bore of the body for frictionally holding the work, and flexible friction means disposed within the bore adapted for abutting engagement with the jaw for driving the work.

3. In a chuck the combination of a chuck-body having a cylindrical bore, and an ejecting work-holder comprising a ring-like member rotatably fitting the bore of the body and having a bore for the reception of the work, and having an ejecting plunger within the bore.

4. A chuck comprising the combination of a chuck-body having a cylindrical bore, said chuck adapted to receive the work endwise of the bore, a holder for the work disposed within the bore and adapted to have longitudinal and rotary movement therein, and means operative by the holder for effecting yieldable abutting connection between the body and the holder for driving the work.

5. A chuck comprising the combination of a chuck-body having a cylindrical bore, said chuck adapted to receive the work endwise of the bore, a holder for the work disposed within the bore and adapted to have longitudinal and rotary movement therein, means operative by the holder for effecting yieldable abutting connection between the body and the holder for driving the work, and means for changing the degree of yieldability of said connection.

6. A chuck comprising the combination of a chuck-body having a cylindrical bore, said chuck adapted to receive the work endwise of the bore, a holder for the work disposed within the bore and adapted to have longitudinal and rotary movement therein, ejecting mechanism, and means operative by the holder for effecting yieldable abutting connection between the body and the holder for driving the work.

7. A chuck comprising the combination of a chuck-body having a cylindrical bore, said chuck adapted to receive the work endwise of the bore, a holder for the work disposed within the bore and adapted to have longitudinal and rotary movement therein, ejecting mechanism carried by the holder for ejecting the work from the holder, and means operative by the holder for effecting yieldable abutting connection between the body and the holder for driving the work.

8. In a chuck, the combination of a chuck-body having a cylindrical bore, a work-holder comprising a ring-like member rotatably fitting the bore of the body and having a bore for centering and for holding the work, an ejector member normally carried by the work-holder and having a plunger projecting into the bore of the holder, a spring interposed between the holder and the end wall of the body for frictionally connecting said holder to the body, and a spring interposed between said wall and the ejector member for actuating said member.

In testimony whereof, I, the said JOHN SHARP, have hereunto set my hand.

JOHN SHARP.

Witnesses:
 ROBT. D. TOTTEN,
 JOHN F. WILL.